Figure 1:
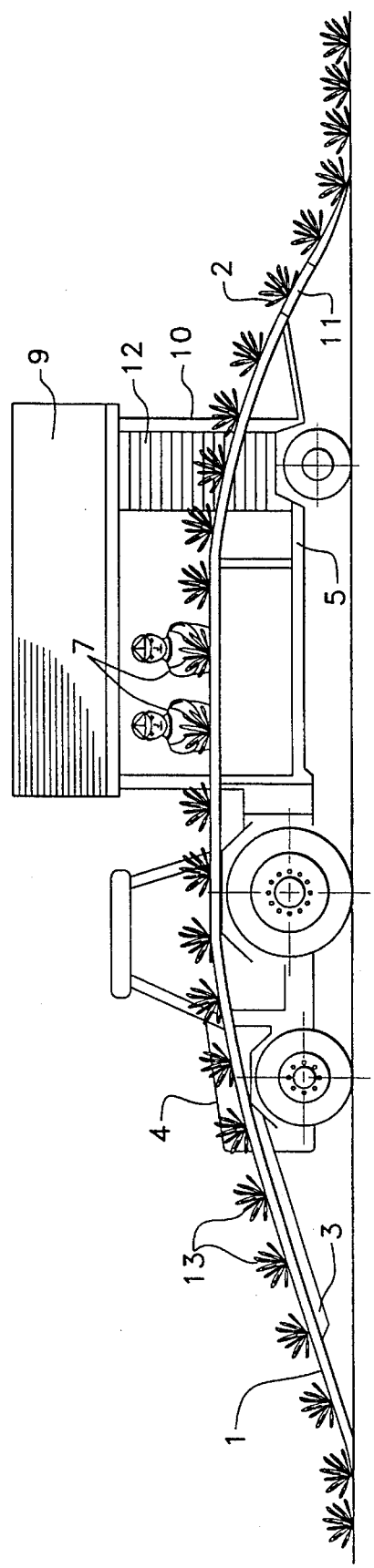

United States Patent [19]

Nilsen

[11] Patent Number: 5,473,874
[45] Date of Patent: Dec. 12, 1995

[54] METHOD AND DEVICE FOR HARVESTING USEFUL PLANTS

[75] Inventor: Walter Nilsen, Skoger, Norway

[73] Assignee: Wani Industrier AS, Drammen, Norway

[21] Appl. No.: 244,588

[22] PCT Filed: Dec. 2, 1992

[86] PCT No.: PCT/NO92/00189

§ 371 Date: Jun. 3, 1994

§ 102(e) Date: Jun. 3, 1994

[87] PCT Pub. No.: WO93/10657

PCT Pub. Date: Jun. 10, 1993

[30] Foreign Application Priority Data

Dec. 3, 1991 [NO] Norway .................................. 914743
Sep. 30, 1992 [NO] Norway .................................. 923806

[51] Int. Cl.⁶ .......................... A01D 46/20; A01G 9/02; A01G 31/04
[52] U.S. Cl. ............................... 56/327.1; 47/65
[58] Field of Search ................... 56/327.1; 47/64, 47/65 D, 62 C

[56] References Cited

U.S. PATENT DOCUMENTS

| | | |
|---|---|---|
| 1,841,509 | 1/1932 | Van Damme . |
| 2,902,795 | 9/1959 | Heigl ............................................. 47/58 |
| 3,172,234 | 3/1965 | Eavis ............................................. 47/1.2 |
| 3,503,196 | 3/1970 | Jarrett ...................................... 56/327.1 |
| 3,771,258 | 11/1973 | Charney ...................................... 47/65 D |
| 4,175,355 | 11/1979 | Dedolph ........................................ 47/64 |
| 4,379,375 | 4/1983 | Eisenberg et al. ......................... 47/65 D |
| 4,476,651 | 10/1984 | Drury .......................................... 47/65 D |
| 4,616,468 | 10/1986 | Munoz ................................. 56/327.1 X |

FOREIGN PATENT DOCUMENTS

| | | |
|---|---|---|
| 209934 | 1/1987 | European Pat. Off. ............... 47/62 C |
| 2550465 | 6/1975 | France . |
| 2644669 | 9/1990 | France . |
| 2047820 | 4/1971 | Germany . |
| 2037013 | 2/1972 | Germany . |
| 2449714 | 4/1975 | Germany . |
| 791274 | 1/1981 | U.S.S.R. ................................ 47/65 D |
| 2042491 | 9/1980 | United Kingdom ................... 47/62 C |
| 1587550 | 4/1981 | United Kingdom . |
| 2074001 | 10/1981 | United Kingdom . |

OTHER PUBLICATIONS

Translation of U.S.S.R. Reference 791,274.

*Primary Examiner*—Stephen J. Novosad
*Attorney, Agent, or Firm*—Reed Smith Shaw & McClay

[57] ABSTRACT

A device for cultivating and harvesting growths (2,41) is disclosed where the growths (2,41) are cultivated in sectioned and/or flexible channels (1) which, when harvesting the growths (2,41) are led, by using a vehicle (4), past working stations (6) associated with the vehicle (4), where channels (1) are conveyed and elevated from the ground and relowered approximately to their starting position in conveying devices (3) running along the vehicle (4). The system is especially suited for harvesting strawberries.

26 Claims, 5 Drawing Sheets

METHOD AND DEVICE FOR HARVESTING USEFUL PLANTS

The present invention concerns a device and a method for cultivating, growing and harvesting vegetables and berries, as well as growths growing in a similar fashion as the ones mentioned above.

Previously, when harvesting vegetables and berries the harvester, during the entire time of the picking and harvesting has been forced to bend over or kneel to be able to perform the picking or harvesting. This has in many cases caused exhaustion damages, bad knees, back and neck as well as a poor speed during the harvesting because the working positions are tiresome in themselves. Additionally, in bad weather the harvesting has not been pleasant at all, because it is impossible to place entire fields under a roof, and it is also necessary for the plants to receive rain and precipitation to be able to grow.

There has, at least to alleviate the position of the body when harvesting, been proposed different kinds of solutions, everything from movable devices where the harvester lies on a platform mounted on caterpillars and directs the device with his legs, to simply bringing along a camping chair into the field, but all these solutions suffer from being either too impractical or also being equally cumbersome as picking berries without any aiding devices at all.

The purpose of the present invention is to avoid all the above mentioned disadvantages and at the same time as well as additionally, to produce an improved system for cultivation of the plants before the harvest.

To obtain these advantages, the plants which are to be harvested are cultivated in channels made of a flexible material. During the harvest these channels are placed on rails or conveyor belts running on one or both sides of a locomotive vehicle, e.g. a tractor. The rails or conveyor belts lead the channels including the plants rearwards towards a platform, e.g. a trailer with a platform, where there is a number of people harvesting the vegetables or berries. The channels with the plants run preferably over a table on the platform of the trailer, and are then again led downwards on the backside of the platform, e.g. in the same way they were placed before the harvesting started. It is preferred that the platform is equipped with a roof and that the persons harvesting the vegetables or berries are located at both sides of the channels passing slowly past the harvesting stations.

Figure 2:
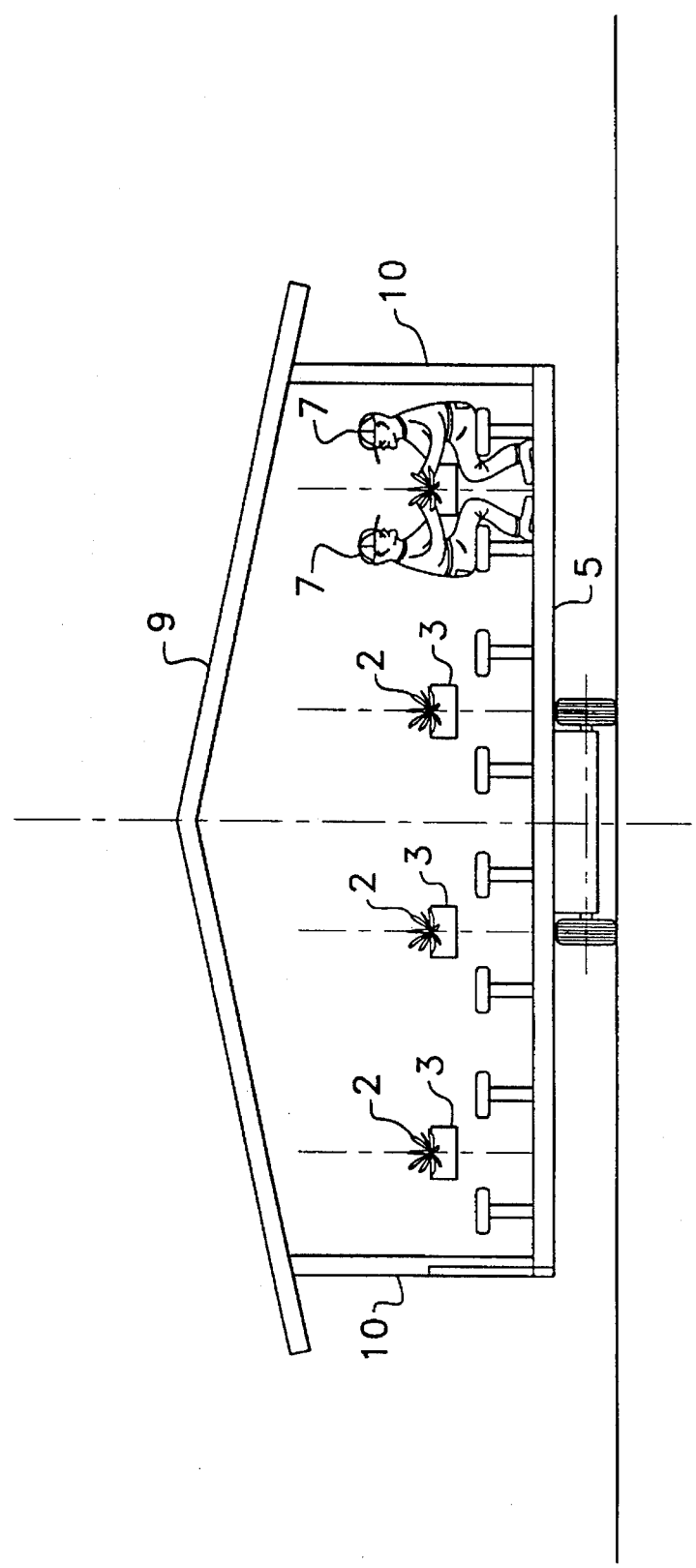
Figure 3:
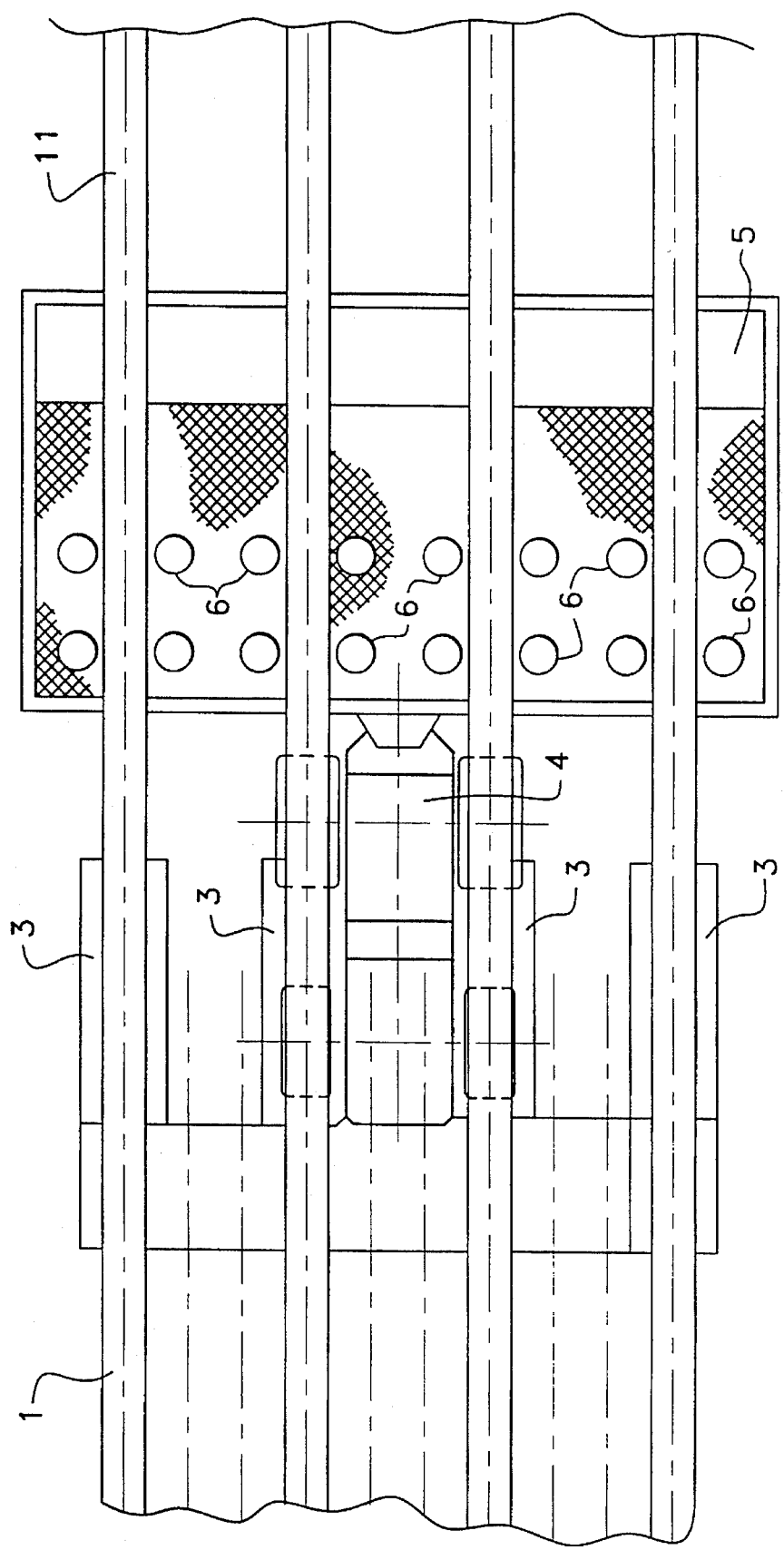
Figure 4A:
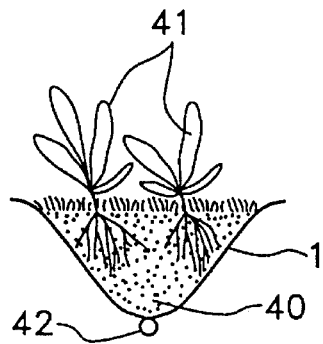
Figure 4B:
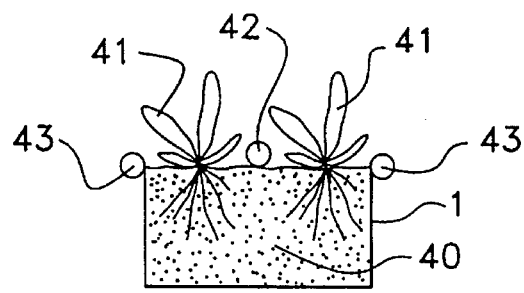
Figure 4C:
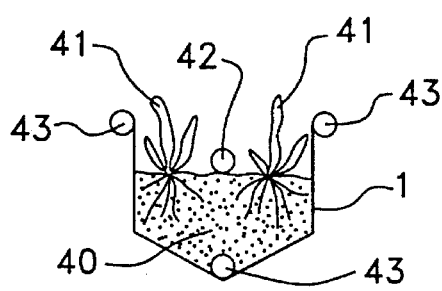
Figure 4D:
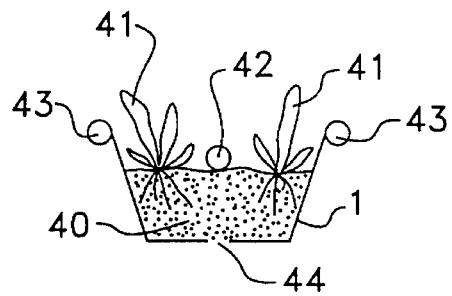
Figure 5:
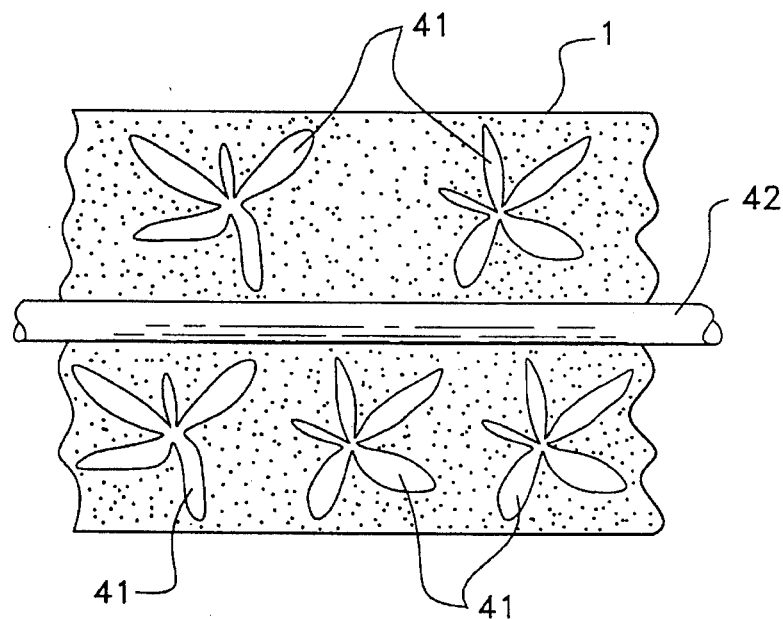
Figure 6:
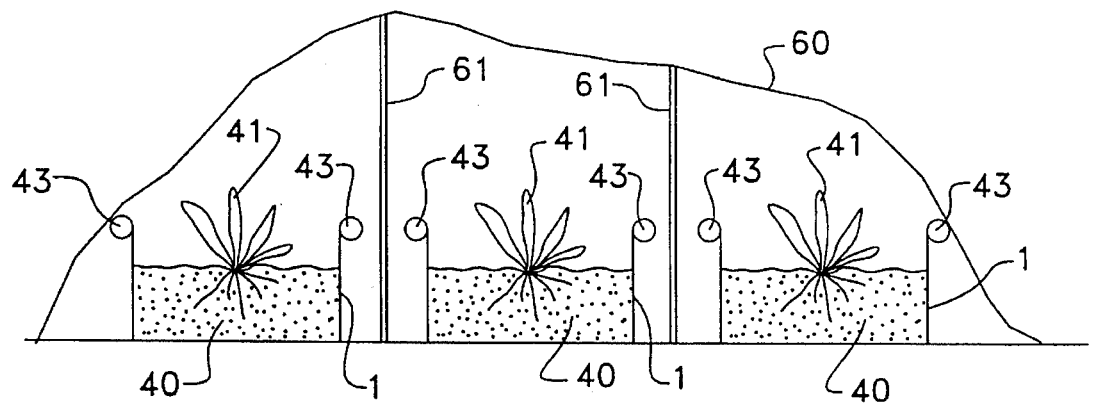

The present invention will be more closely described below with reference to the accompanying figures, wherein:

FIG. 1 shows the harvesting system according to the invention observed from the side, FIG. 2 shows the harvesting system according to the invention depicted in FIG. 1 seen from the rear, FIG. 3 shows the harvesting system according to the invention depicted in FIGS. 1 and 2 observed from above, FIGS. 4 a–d show embodiments of the design of a culturing channel used in the present invention, FIG. 5 shows an example of the location of growths in a culturing channel used in the present invention, FIG. 6 shows how the present invention may be used for both protecting and speeding up the growth of the plants which are to be harvested by using channels according to the present invention.

In FIGS. 1–3 is shown the principle for the harvesting system according to the invention. The channels 1, wherein the plants 2 have already been grown to ripeness, are placed on leading tracks or conveyor belts 3 running from the fore-edge of the driving vehicle 4 (or from the fore-edge of the trailer(s) 5), over the platform of the trailer(s) 5 and are lowered down preferably to approximately their initial position on the ground behind the trailer. Along the runway for the channels 1 there are located positions 6 for those persons 7 who are responsible for the harvesting of the plants 2. The location of the positions 6 is preferably on both sides of the channels 1, and may e.g. comprise chairs or stools. There may also exist a number of such positions 6 in the lengthwise direction of the channels 1 depending on the space available on the platform of the trailer 5. The trailer 5 may also be equipped with a roof 9 and possibly with walls 10 to make the harvesting site independent of the weather conditions.

By designing and performing the harvesting in the above disclosed way, a much more efficient harvesting may be performed wherein a comfortable and correct posture of the persons being responsible for the harvesting is ensured and at the same time a greater harvesting capacity and independence of the weather.

As an example of the dimensions of the harvesting system according to the invention, the channels 1 may be given a width of 15 cm and may be placed at a distance from each other of 1,5 m. In such a case the leading tracks or belts 3 may lie at a distance from each other of correspondingly 1,5 m, and have a width of e.g. 30 cm. To avoid making the trailer 5 too wide, four channels 1 may for example be placed side by side in the platform of the trailer 5. By giving the channels 1 a distance from each other of 1,5 m, there will additionally be provided room for locating positions 6 for harvesters 7 on each side of the channels 1 without them getting in each other's way. Alternatively, the harvesters 7 may sit facing alternately on the platform, thus making the distance between the channels 1 shorter. Such details will be obvious for the person skilled in the art.

As shown in FIGS. 1–3 the plant channels 1 are being caught by the channel catching devices 3 which have been lowered and pressed under the plant channels 1. The entire device according to the invention has been depicted mounted on a tractor 4 where the channel catching device 3 is secured to a loading apparatus in front of the tractor, and the working platform 5 is fastened to the drawing hook in the rear. The channel catching device 3 is somewhat elevated when starting and driving the tractor 4 to avoid possible obstacles when harvesting the plants. The plant channels 1 are pushed up into the leading tracks 3 laying on both sides of the tractor 4 and are proceeding rearwards on the tractor to the working platform 5. On the working platform 5 a number of harvesters may sit and harvest from the plants as the plant channel moves past. When the plant channel 1 has passed the picker, it is relowered down to the ground via leading tracks 11. The working platform is equipped with a roof 9, so that picking of berries also may be done when it is raining. A store of empty and full crates is located on the working platform 5.

Concerning the design of the plant channels 1, these may be formed in a number of different ways. They may for example be sectioned or smooth and may be made of soft or rigid material. A suitable material may be plastic. The channels 1 ought, however, to be continuous in their running direction, so that they may easily be conveyed up and down on the channel tracks 3,11.

The channels 1 also ought to be formed in a way which allows the plants 13 to develop roots through the channel material. Further, they ought to have a sufficient depth for the plants to be able to develop roots. Such a depth will depend on the plant type, but it may e.g. be 5–10 cm. As previously mentioned, the width of the channels may be about 15 cm, but both narrower and wider channels may also be possible.

The cross-sectional form of the channels 1 is not critical, a square, u-shaped or v-shaped profile is among those forms which may be advantageous. The preferred profile is square, and an example of such a profile is shown in FIG. 4b. A u-shaped profile is advantageous as well, and such a profile is shown in FIG. 4a.

Referring to FIGS. 4 *a–d,* here embodiments are shown of the plant channels 1 according to the invention. The material 40 in which the plants grow, may be any suitable growth medium such as turf or peat earth, soil etc., depending on what kind of growth medium is suitable for the plants, and it may also be supplied with or consist of other materials such as glass wool or rock wool or polymers such as PVC or polyurethane. If the growths being cultured are mushrooms, the growth medium will comprise such materials that are suitable therefore. Choice of growth material and possible additive medium will easily be determined by the person skilled in the art. The height for filling the channels 1 with growth medium 40 may also be determined by the person skilled in the art, and the channels may either be filled completely full as shown in FIGS. 4a and 4b, or they may be filled partly full, e.g. as shown in FIGS. 4c and 4d.

To encourage the growth of the plants 41, the channels are preferably equipped with a sprinkler system 42 and possibly with heating cables 43. The location of such systems is not critical, and the sprinkler system 42 may be located on top of the growth medium 40 as shown in FIGS. 4b–d or may also be located inside the growth medium 40, e.g. internally on the bottom of the channel 1, or externally on the bottom of the channel 1 as shown in FIG. 4a. The heating cables 43 may also be located randomly on or about the channels 1, but it is preferred that they are situated along the edges of the channels 1 as shown in FIGS. 4b–d. In FIG. 4c is shown an extra heat cable 43 lying internally in the bottom of the channel 1. Further, the channels 1 may also comprise drainage/airing apertures 44, as shown in FIG. 4d.

The growths 41 may also be located randomly in the channels 1, but from an efficiency point of view, e.g. when harvesting, it is preferred to place the growths alternating in rows in the lengthwise direction of the channel 1 about the center line thereof, where the lines 42 for the sprinkler system are also located, as shown in FIG. 5.

By using channels 1 with heating cables 43 according to the present invention, it is also possible to cultivate growths during long periods of the year when the conditions outside are too severe for the plants to grow. To facilitate this the site for the growing of the plants 41 may be covered with e.g. a plastic sheet 60 as shown in FIG. 6, and such a plastic sheet 60 may possibly be supported by e.g. sticks 61. The heat cables should by such a cultivation provide sufficient heat for the plants to be comfortable under the plastic sheet 60, and the plastic sheet 60 furthermore retains the humidity so that the plants do not dry out. The heating cables 43 may be heated by a suitable medium, e.g. electricity or hot water. The material inside the heating cables is preferably of a heat-conducting material, and if electrical heating is used, such a material may be a metallic conductor such as copper. The heat conducting cables 43 may also be supported by separate brackets or brackets on the channels 1. To optimally use the space when planting the growths as shown in FIG. 6, it is also possible to locate the channels 1 adjacent to each other since this will reduce the need for energy/heat. The channels 1 will subsequently be separated during the growth time, depending on the size of the growths.

Examples of plants which may be cultivated and harvested with the system according to the present invention are strawberries, lettuce, cabbage, beans, cucumbers, blueberries, radishes, flowers and mushrooms.

I claim:

1. An apparatus for assisting a person in the cultivation, growing, and partial or total harvesting of plants, fruits and vegetables, or other vegetation, said apparatus comprising:
   a platform on which said person is located;
   a channel containing a growth medium and said vegetation; and
   a working station located on said platform through which said channel moves at a working level above said platform, and wherein said working level allows said person to access said vegetation and growth medium in order to perform said cultivation, growing, harvesting or other operations on said vegetation and growth medium.

2. The apparatus of claim 1, wherein said persons have a waist level and an eye level, and wherein said level of said channel is between about said waist level and about said eye level of said person.

3. The apparatus of claim 2, wherein said apparatus further comprises a means for conveying said channel through said working station.

4. The apparatus of claim 3, wherein said conveying means further comprises a track or conveyor for conveying said channel.

5. The apparatus of claim 4, wherein said channel is originally located at ground level and said working station is above ground level, and wherein said track or conveyor lifts said channel from ground level to said working level and returns said channel to ground level after said person has performed said operations upon said vegetation or growth medium.

6. The apparatus of claim 5, wherein said working station accommodates more than one person such that said persons may simultaneously perform said operations on said vegetation or growth medium.

7. The apparatus of claim 6, wherein said channel has opposite sides and said persons are located on each of said sides of said channel.

8. The apparatus of claim 7, wherein said apparatus comprises a plurality of said channels and said working stations.

9. The apparatus of claim 8, wherein said channels are continuous.

10. The apparatus of claim 8, wherein said channels are segmented.

11. The apparatus of claim 9, further comprising a means for heating said growth medium and vegetation.

12. The apparatus of claim 10, further comprising means for heating said growth medium and vegetation.

13. The apparatus of said claim 9, further comprising means for delivering fluid to said growth medium and vegetation.

14. The apparatus of said claim 10, further comprising means for delivering fluid to said growth medium and vegetation.

15. The apparatus of claim 11, wherein said channel has a square cross-section and multiple surfaces and said heating means comprises a heating cable adjacent to at least one surface of said channel.

16. The apparatus of claim 12, wherein said channel has a square cross-section and multiple surfaces and said heating means comprises a heating cable adjacent to at least one surface of said channel.

17. The apparatus of claim 13, wherein said channel has a square cross-section and a longitudinal center line, and said fluid delivery means comprises a conduit adjacent to said center line.

18. The apparatus of claim 14, wherein said channel has a square cross-section and a longitudinal center line, and said fluid delivering means comprises conduit adjacent to said center line.

19. The apparatus of claim 5, wherein said growth medium is polyurethane foam.

20. The apparatus of claim 5, wherein said apparatus is used for cultivating, growing, harvesting or other operations on strawberries.

21. The apparatus of claim 5, wherein said platform further comprises a roof.

22. The apparatus of claim 21, wherein said platform further comprises walls.

23. The apparatus of claim 5, wherein said channel has a U-shaped cross-section.

24. The apparatus of claim 5, wherein said channel has a V-shaped cross-section.

25. The apparatus of claim 5, wherein said channel has opposite side walls wherein said side walls are not parallel.

26. The apparatus of claim 5, wherein said channel has a plurality of apertures.

* * * * *